(12) United States Patent
Numminen

(10) Patent No.: US 7,230,932 B2
(45) Date of Patent: Jun. 12, 2007

(54) METHOD AND APPARATUS FOR DISCONTINUOUS RECEPTION SCHEME AND POWER SAVING MODE FOR USER EQUIPMENT IN PACKET ACCESS MODE

(75) Inventor: Jussi Numminen, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 723 days.

(21) Appl. No.: 09/930,379

(22) Filed: Aug. 15, 2001

(65) Prior Publication Data

US 2002/0064140 A1    May 30, 2002

Related U.S. Application Data

(60) Provisional application No. 60/226,162, filed on Aug. 18, 2000.

(51) Int. Cl.
G08C 17/00    (2006.01)
(52) U.S. Cl. .................. 370/311; 370/318; 370/349; 455/13.4; 455/343.1; 455/522; 455/574
(58) Field of Classification Search .............. 370/310, 370/311, 315, 318, 333, 337, 347, 349, 501; 455/13.4, 343, 434, 435, 522, 571, 572, 574
See application file for complete search history.

(56) References Cited

U.S. PATENT DOCUMENTS

| | | | |
|---|---|---|---|
| 4,679,244 A | 7/1987 | Kawasaki et al. ........... 455/54 |
| 4,713,809 A * | 12/1987 | Mizota ....................... 370/315 |
| 5,197,065 A | 3/1993 | Calvignac et al. ........... 370/79 |
| 5,239,557 A * | 8/1993 | Dent .......................... 370/342 |
| 5,678,192 A | 10/1997 | Paavonen et al. .......... 455/38.3 |
| 5,710,975 A * | 1/1998 | Bernhardt et al. ......... 455/38.3 |
| 5,757,789 A * | 5/1998 | Dent .......................... 370/337 |
| 6,035,208 A * | 3/2000 | Osawa ........................ 455/522 |
| 6,236,856 B1 * | 5/2001 | Abbadessa .................. 455/423 |
| 6,259,928 B1 * | 7/2001 | Vembu ....................... 455/522 |
| 6,418,127 B1 * | 7/2002 | Laurent ...................... 370/311 |
| 6,438,375 B1 * | 8/2002 | Muller ........................ 455/435 |
| 6,553,228 B1 * | 4/2003 | Kotzin ........................ 455/434 |

FOREIGN PATENT DOCUMENTS

EP    1158685    11/2001

OTHER PUBLICATIONS

H. Holma et al., WCDMA for UMTS, 2000 John Wiley & Sons, Ltd., pp. 34-40, 2000.

(Continued)

*Primary Examiner*—Seema S. Rao
*Assistant Examiner*—Shick Hom (57) ABSTRACT

A method is described for providing a discontinuous radio link for user equipment in a telecommunication network in a physical radio transmission layer while receiving packets during a packet service mode (i.e. maintaining the logical connection in higher protocol layers). The user equipment enters into a discontinuous reception mode receiving either a) two or more slots of each radio frame, or b) one or more frames; and powers down its receiver circuitry for either a) the remaining slots of the radio frame or b) one or more predefined periods, signaled by the telecommunication network. The two or more slots may be consecutive or non-consecutive slots in the radio frame.

30 Claims, 7 Drawing Sheets

(The Higher Layer Signaling Scheme)

OTHER PUBLICATIONS

H. Holma et al., WCDMA for UMTS, 2000 John Wiley & Sons, Ltd., pp. 187-203, 2000.
H. Holma et al., WCDMA for UMTS, 2000 John Wiley & Sons, Ltd., pp. 154-163, 2000.
H. Holma et al., WCDMA for UMTS, 2000 John Wiley & Sons, Ltd., pp. 303-315, 2000.
H. Holma et al., WCDMA for UMTS, 2000 John Wiley & Sons, Ltd., pp. 109-110, 2000.

* cited by examiner

Figure 1 (The Basic Invention)

Figure 2 (The Base Station (Node B))

Figure 3 (The User Equipment)

Figure 4 (Power Control Sequence)

Figure 5 (The Frame Structure of the Downlink DPCH)

Figure 6 (The Usage of the TFCI Fields)

Figure 7 (The Higher Layer Signaling Scheme)

Figure 8
(User Equipment Randomizing Algorithm Module)

Figure 9
(Radio Network Control Randomizing Algorithm Module)

METHOD AND APPARATUS FOR DISCONTINUOUS RECEPTION SCHEME AND POWER SAVING MODE FOR USER EQUIPMENT IN PACKET ACCESS MODE

This application claims the benefit of U.S. Provisional Application No.: 60/226,162 filing date Aug. 18, 2000.

BACKGROUND OF THE INVENTION

1. Field of Invention

The present invention relates to a telecommunications network; and more particularly to a new wideband code division multiple access (WCDMA) discontinuous radio link operation mode which is intended to be used in long packet service sessions to save battery life for user equipment (UE) in a packet service mode, where the telecommunications network has not released the connection, but no data is transferred.

2. Description of Related Art

In WCDMA, the packet service session can be active for a relatively long period of time, and due to a bursty nature of transferred data there is no data flow activity between an end-user and the communications network. During this period, the UE is only performing neighbor cell measurements, and not even performing these measurements if radio conditions are stable and new commands from the network have not been received. From a user's point of view, the terminal is consuming power but not providing good performance (long service time).

In the prior art, the UE receiver is active during a whole packet connection. (In WCDMA, during a packet transfer session the UE can be in CELL-FACH and CELL-DCH states.) A mechanism to provide power saving in the UE receiver by discontinuous reception during a packet session does not exist in the prior art.

The operation time of the UE in the packet mode is fully dependent on operator radio bearer (RB) release settings (which are not specified) and how fast the connection is released after the packet transfer session.

In one case, since packet transmission can start in any frame, all slots in the frame in the downlink (DL) have to contain transport format combination indicator (TFCI) bits, the receiver (rx) has to be on during the whole frame in all frames in order to decode the TFCI, and TFCI decoding has to be performed in each frame. (Handover measurements are also assumed to be running continuously.) With the help of the TFCI, the UE detects whether the dedicated physical data channel (DPDCH) (packet) exists. If not all slots in the frame in the DL contain TFCI bits, then the UE has to use a pilot energy comparison method first to evaluate whether the DPDCH exists in the frame. In this case, all the slots only contain pilot & TFCI information only if DPDCH exists. In both of these cases, it means that the rx side has to be on and doing decoding in each slot in the frame. Thus, no rx side battery savings can be achieved during the dedicated physical control channel (DPCCH) gating.

Alternatively, in case the network is able to schedule the time instants when new packets are transferred to the UE, it is possible to signal to the UE an activity period value, which indicates the radioframe(s) the UE's have to be able to receive and decode from the network. During the same activity period, the UE is able to send measurement messages in reverse link (uplink) to the network.

SUMMARY OF INVENTION

In its broadest sense, the present invention features an interface protocol for providing a discontinuous radio link for user equipment (UE) in a telecommunication network a physical radio transmission layer while receiving packets during a packet service mode, wherein the UE enters into a discontinuous reception mode by receiving, either:

a) two or more slots of a radio frame and powering down its radio receiver for the remaining slots of the radio frame, or b) one or more frames based on the predefined activity period by the network and powering down the receiver for the remaining time of the packet transfer session.

Method A

In one method, packet transmission may be defined to start in one out of every K radio frames.

The two or more slots may be consecutive or non-consecutive slots in the radio frame.

The UE may have an active period of two or more consecutive slots for performing neighbor measurements and power control functions. The UE may adapt the active period depending on neighborhood conditions by increasing the active period when neighborhood conditions are unstable, and decreasing the active period when neighborhood conditions are stable.

In operation, the UE responds to a change in the status of a transport format combination indicator (TFCI) field in the two or more slots of the radio frame for determining an end of a data packet.

In the discontinuous reception mode, the UE monitors a command in a transmission power control (TPC) field in the two or more slots of the radio frame and the status of the TFCI field in order to respond to commands from the telecommunications network.

The UE determines a start of a new packet transmission by monitoring the status of the TFCI field in a previous radio frame before a new packet data radio frame.

In the discontinuous reception mode, the UE switches off the receiver circuitry for a part of the radio frame. The radio frame may include fifteen slots, and the part of the radio frame that the UE switches off the circuitry in the receiver is thirteen of fifteen slots.

Method B

In another method, the UE can receive higher layer signalling from a controller in the telecommunications network that defines a period where the UE needs to perform a decoding of the radio frame or slots in order to detect if the packet transmission is active. The UE determines that the radio frame contains data targeted to it by decoding the radio frame using a cyclic redundancy code and having a correct cyclic redundancy code result. Alternatively, the UE determines that the radio frame does not contain data targeted to it by decoding the radio frame using a cyclic redundancy code and having an incorrect cyclic redundancy code result, and waits an agreed period of time before decoding a subsequent radio frame.

In the discontinuous period, the UE waits either a fixed or variable discontinuous period of time. The UE, the controller of the telecommunication network or both may perform an algorithm randomizing the variable discontinuous period. In a random non-receiving period, the controller of the network defines the discontinuous period where the UE needs to perform a decoding of frame or slots in order to detect if the packet transmission is active or not. If the packet transmission is not active, the next active period follows after a random period of N radio frames. The controller of the network signals the value of N to the UE.

In the aforementioned method A, when the UE enters into the discontinuous reception and transmit mode by receiving 2 or more consecutive slots and then powers down the receiver for 2 to n slots per each frame, the UE can perform one or more closed loop power control sequence and hence follow with reasonable accuracy the fading of the UL and DL, since the transmitter is active approximately the same time as the receiver. By doing this, the power savings in the UE can be improved considerably.

In the aforementioned method B, when the UE enters into the discontinuous reception and transmit mode by receiving one or more radio frames, and powers down the rest of the time, the UE can perform the closed loop power control by powering on up prior the radio frame(s) the UE decoding of possible user data occurs. Since the transmitter is also active at the same time period, and the considerable long time period for power control synchronization in UL and DL the impact of the interference to the system is negligible, and the UE power savings in the UE can be improved considerably.

The UE may also concurrently enter into a discontinuous transmit mode and perform one or more closed loop power control sequences for following the fading of an uplink, a downlink or both when its transmitter is active.

In effect, the control of the UE stays in the controller of the network, but it enables the UE to save battery power when no data is sent, while the connection still exists in higher protocol layers.

Since the activity period of the UE is well defined in order to maintain packet service working, there is no degradation of service quality.

Moreover, there is a possible savings in network resources in the case where the UE is in a soft hand over to two or more node Bs (i.e. base stations). It's well known to the controller of the network when the radio access bearer (RAB) to each UE in the physical layer is actually utilized, so there is a possibility to "interleave" the physical resources among multiple Ues at the same time. Interleaving of the RAB resources could enhance the packet service capacity further. Also the signaling overhead due to both methods is very moderate, since the parameters can be confirmed once at the beginning of the connection.

The present invention also features apparatus for performing the aforementioned interface protocol, and has possible applications in all discontinuous (NRT) type of services in third generation wireless systems.

DETAILED DESCRIPTION OF INVENTION

Figure 1:
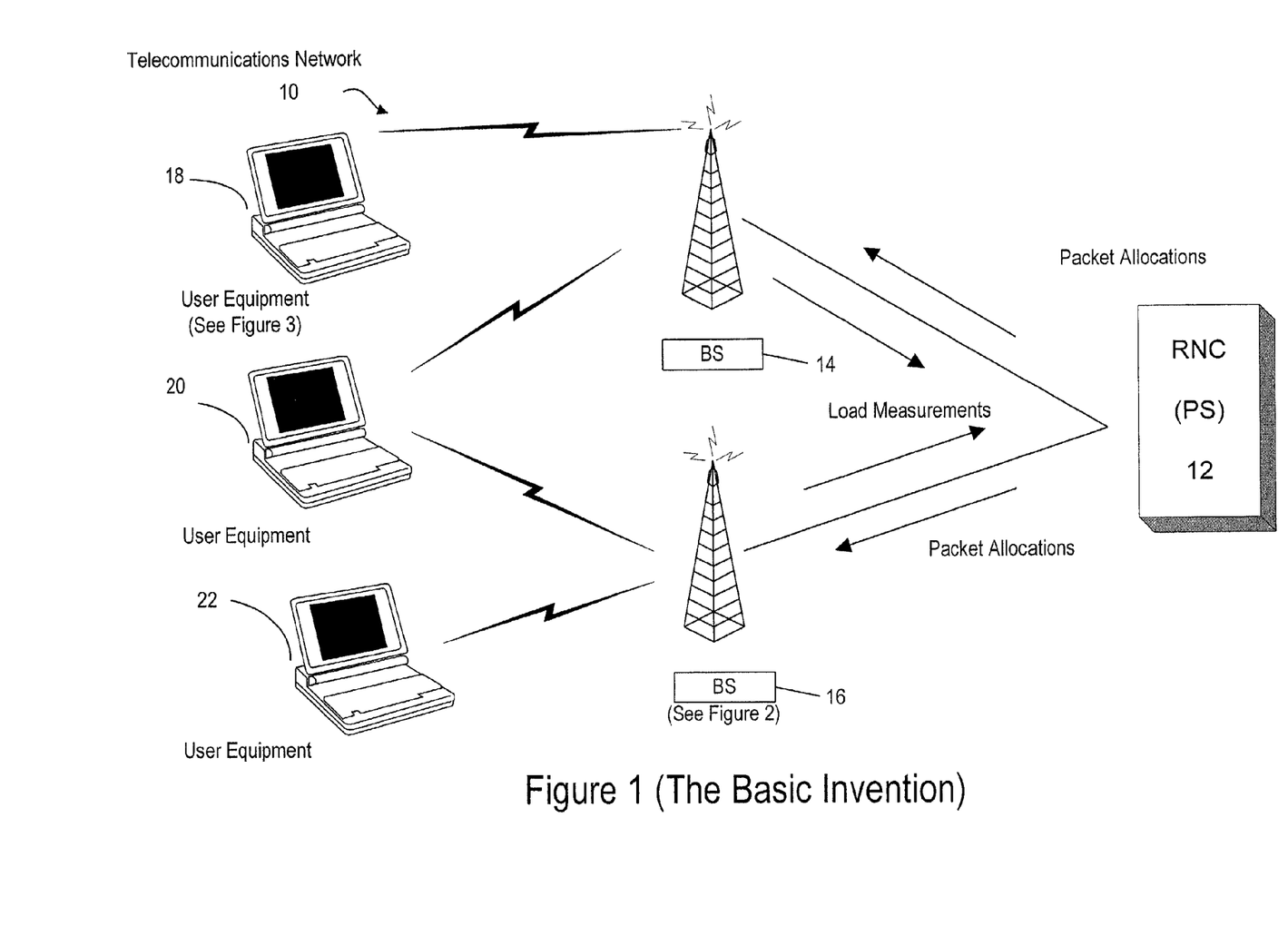
FIG. 1 is a block diagram of a telecommunications network that forms the subject matter of the present invention.

FIG. 1: The Basic Invention

FIG. 1 shows a telecommunications network generally indicated as 10 having a radio network controller (RNC) 12, base stations (BS) 14, 16 and user equipment (UE) 18, 20, 22. The base station 14 has a base station power control loop module 14 a shown in FIG. 2, and the UE 18, 20, 22 has receiver equipment 18a and a user equipment power control loop module 18b shown in FIG. 3. In operation, the radio network controller 12 provides packets during a packet session to the UE 18, 20, 22 via the base stations 14, 16.

The present invention features an interface protocol for providing a discontinuous radio link for the UE 18, 20, 22 in the telecommunications network 10 while receiving packets during a packet service mode, wherein the UE 18, 20, 22 enters into a discontinuous reception mode by receiving, either a) two or more slots (see FIGS. 4–6 ) of a radio frame and powering down its radio receiver 18a for the remaining slots of the radio frame, or b) one or more frames (see FIG. 7) based on the predefined activity period by the network and powering down the receiver 18a for the remaining time of the packet transfer session. The configuration of the telecommunications network 10 in FIG. 1 may be used in implementing either methods of the present invention.

Packet transmission may be defined to start in one out of every K radio frames. The two or more slots may be consecutive or non-consecutive slots in the radio frame. In a discontinuous period, the UE 18, 20, 22 may wait either a fixed or variable discontinuous period of time.

Figure 2:
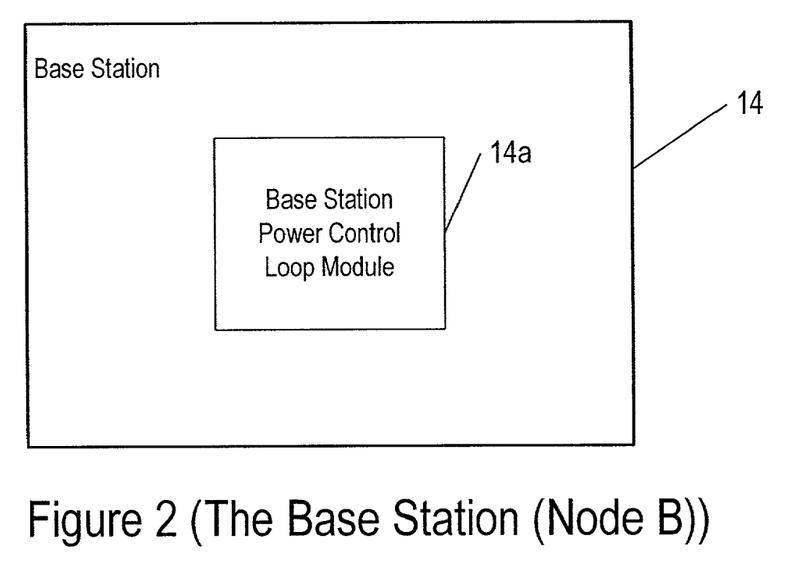
FIG. 2 is a diagram of a base station shown in FIG. 1.

FIG. 2: The Base Station 14

FIG. 2 shows the base station 14, which is also known herein as Node B. The base station power control loop module 14a is shown as part of the base station 14. The base station power control loop module 14 a may be implemented using hardware, software or a combination thereof. In a software embodiment, a typical microprocessor-based design may be used. As a person skilled in the art would appreciate, the microprocessor-based design would typically include a more expensive processor, ROM, RAM, input/output and data and address lines for coupling the same. The scope of the invention is not intended to be limited to any particular software implementation of the base station power control loop module 14a. A person skilled in the art after reading the patent application as a whole would appreciate how to implement any of the aforementioned module in hardware, software, or a combination thereof.

The base station 14 includes many other circuit elements which are not shown or described, but which are all known in the art.

Figure 3:
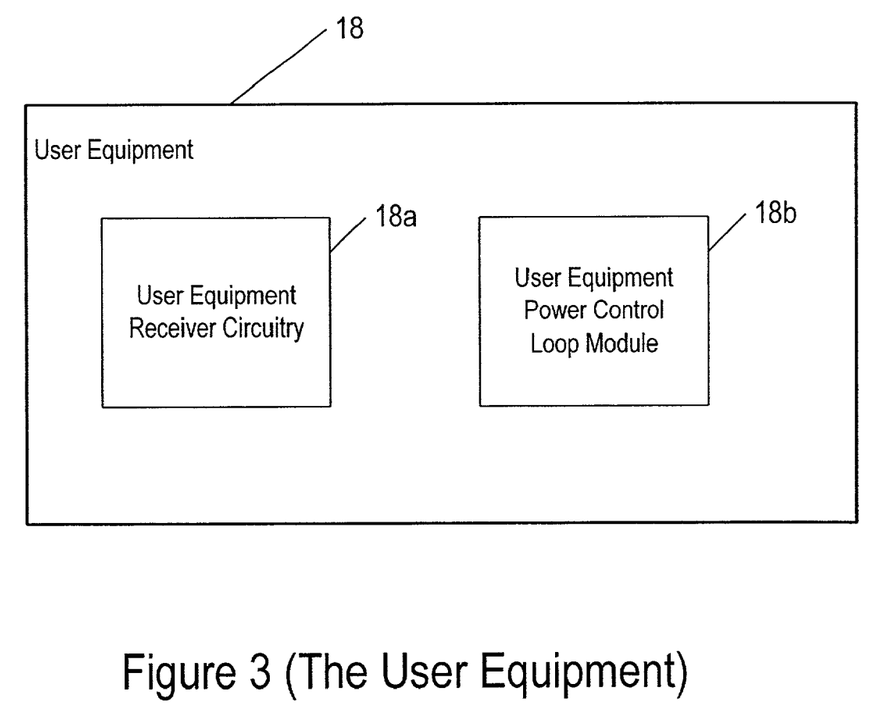
FIG. 3 is a diagram of user equipment shown in FIG. 1.

FIG. 3: The UE 18

FIG. 3 shows the UE 18 which includes the user equipment receiver circuitry 18a and the user equipment power control loop module 18b.

The user equipment receiver circuitry 18a is known in the art, and the scope of the invention is not intended to be limited to any particular implementation thereof.

The user equipment power control loop module 18b is shown as part of the base station 14, and may be implemented using hardware, software or a combination thereof. In a software embodiment, a typical microprocessor-based design may be used. As a person skilled in the art would appreciate, the microprocessor-based design would typically include a more expensive processor, ROM, RAM, input/output and data and address lines for coupling the same. The scope of the invention is not intended to be limited to any particular software implementation of the user equipment power control loop module 18b. A person skilled in the art after reading the patent application as a whole would appreciate how to implement any of the aforementioned module in hardware, software, or a combination thereof.

The user equipment 18 includes many other circuit elements which are not shown or described, but which are all known in the art.

Neighbor Measurements and Power Control

Figure 4:
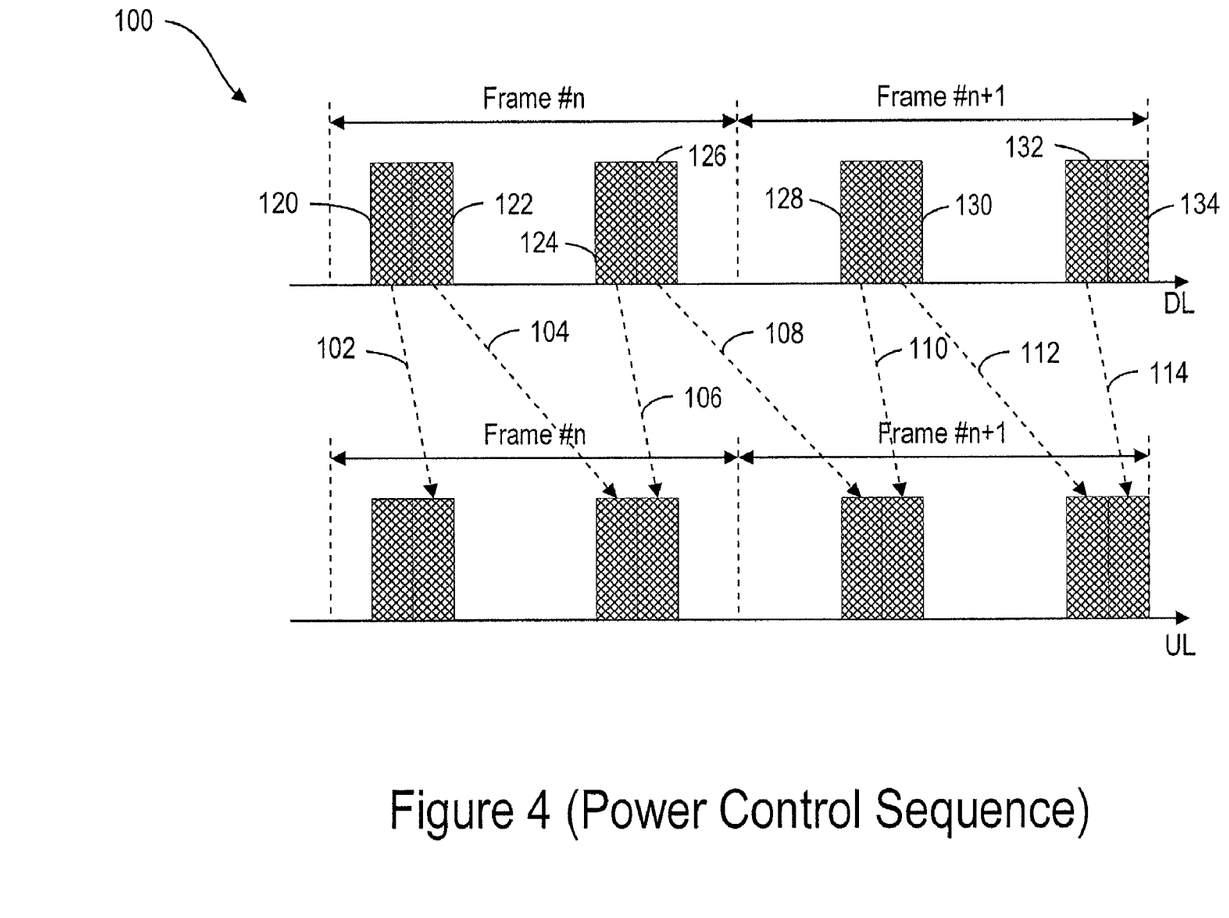
FIG. 4 is a diagram of a power control sequence.

FIG. 4 shows is diagram of the proposed power control and neighbor measurement scheme generally indicated as 100 where 2 consecutive slots are received. The lines 102, 104, 106, 108, 110, 112, 114 from a downlink (DL) to an uplink (UL) indicate that transmit power control information (TPC) is received from the network and it is used to control the transmission power of an uplink transmission.

In effect, to overcome problems in neighbor measurements, in one embodiment of the present invention the active period would consist of 2 or more consecutive slots 120, 122, 124, 126, 128, 130, 132, 134. This algorithm for the active period could also be adaptive, e.g. when the UE realizes the environment is changing too fast it increases it's activity for measurement purposes, e.g. searching new cells. When the radio conditions are reasonably stable, the search of new cells can be reduced or even stopped. Further, when the radio conditions are stable, new cells are not likely to appear so updating of found cells can be reasonably fast. Another option could be that no consecutive slots are to be received but e.g. every 3rd or 5th slot is received.

Figure 5:
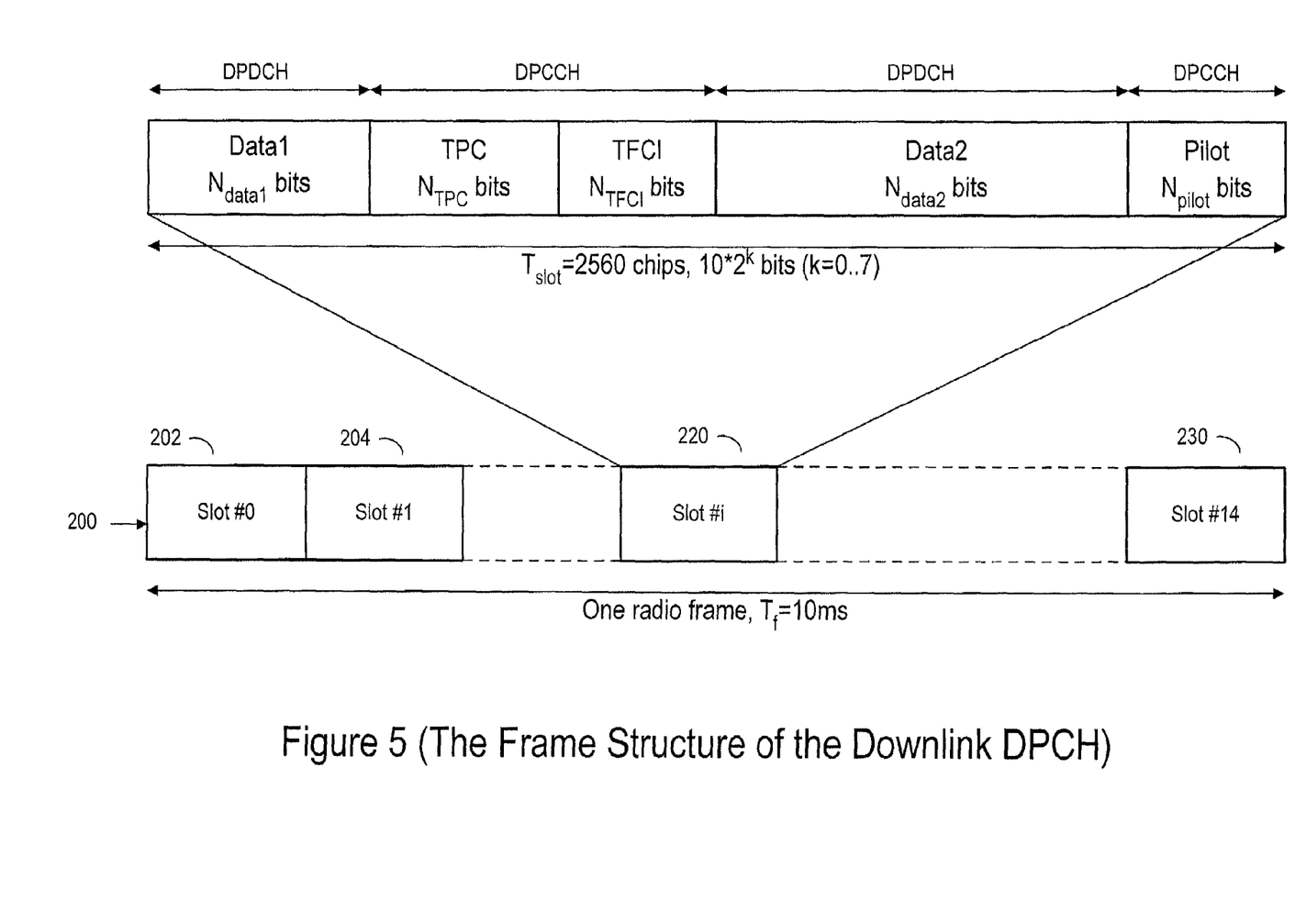
FIG. 5 is a diagram of a frame structure of a downlink DPCH.

FIG. 5 shows one more detailed example of a structure of a frame of a downlink dedicated physical channel (DPCH) 200. Each frame of length 10 ms is split into 15 slots 202, 204, . . . , 220, . . . , 230, each having a length $T_{slot}=2560$ chips, corresponding to one power-control period. As shown, the slot 220 contains a dedicated physical data channel (DPDCH) having data 1 with $N_{data1}$ bits, a dedicated physical control channel (DPCCH) having TPC with $N_{TPC}$ bits and TFCI with $N_{TFCI}$ bits, a DPDCH having data 2 with $N_{data2}$ bits, and a DPCCH having a pilot with $N_{pilot}$ bits.

Within one downlink DPCH, dedicated data generated at Layer 2 and above, i.e. the dedicated transport channel (DCH), is transmitted in time-multiplex with control information generated at Layer 1 (known pilot bits, TPC commands and the TFCI). The downlink DPCH can thus be seen as a time multiplex of a downlink DPDCH and a downlink DPCCH.

Indication of Discontinuous Reception Periods Using TFCI Fields

Figure 6:
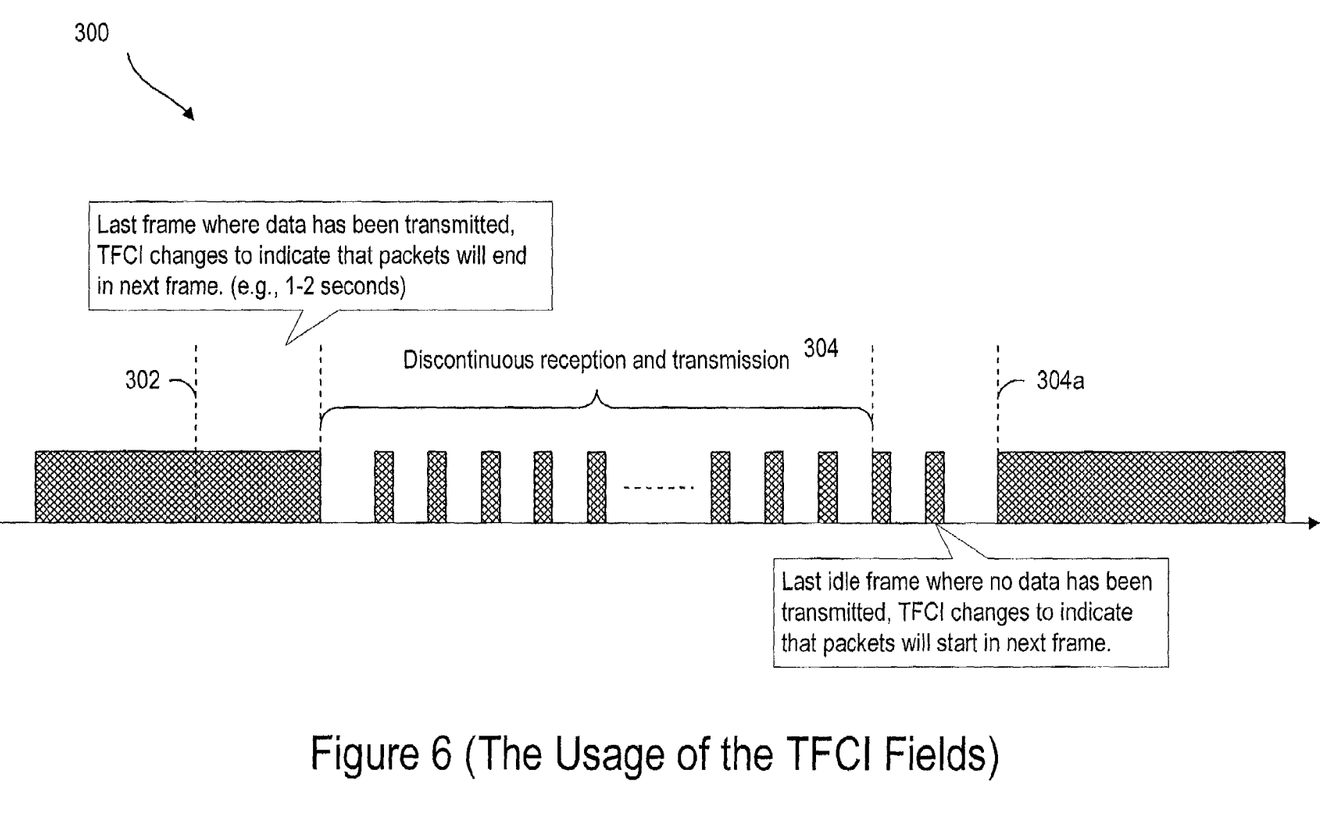
FIG. 6 is a diagram of usage of the TCPI field in the context of the present invention.

FIG. 6 shows a diagram of a series of frames generally indicated as 300 and the usage of the TFCI fields for the indication of discontinuous reception periods. The series of frames 300 includes a last frame 302 where data has been transmitted, and the TFCI changes to indicate that packets will end in a next frame and a discontinuous reception and transmission period 304 with a last idle frame 304a where no data has been transmitted, and the TFCI changes to indicate that packets will start in a next frame.

In operation, in order for the UE 18, 20, 22 in FIG. 1 to know reliably the status of its own packet data connection, there is a signalling mechanism between the radio control network 12 and the UE 18, 20, 22 to inform the UE when the packet transmission occurs.

Information signalling the end of data packet for the UE 18, 20, 22 can be indicated, e.g., by changing the TFCI field in the last frame 302 to an agreed state with the radio control network 12 (FIG. 1). After this the UE 18, 20, 22 is monitoring TPC commands and the TFCI field status (see FIG. 5) in the discontinuous period or mode 304, and responding to the TPC commands from the radio network controller 12 accordingly. The start of a new packet transmission is indicated again by changing the TFCI field status (See FIG. 5) in the previous frame 304a before packet data frame(s), and the UE 18, 20, 22 will decode it when monitoring the TPC command from node B (the base station 14 (FIG. 1)) as well. This feature assumes that the DPCCH channel includes the TFCI and TPC fields as shown in FIG. 5, which can all be utilized, or alternatively a subset of them.

Based on the detection of the start of the discontinuous period 304, the UE 18, 20, 22 (FIG. 1) switches off all or part of the reception circuitry 18a (FIG. 3) for part of the radio frame. In the example above, 2 slots out of 15 in the radio frame 200 (FIG. 5) are received, and during the remaining 13 slots the reception circuitry 18a is switched off. This provides an advantage in that, by receiving the 2 slots, the UE 18, 20, 22 can keep the power control loop running, while also receiving the advantage of a power saving by having the receiver circuitry 18a switched off for the remaining 13 slots. By way of example, the reader is referred to a known power control procedure that can be used as described in a technical document entitled, 3G TS 25.214 (FDD, Physical layer procedures).

Alternatively, embodiments are envisioned wherein only every 3rd or 5th slot is received out of the 15 slots in a given radio frame, to achieve considerable power savings.

The actual change of the TFCI bits may be implemented in the base station 14, 16 (FIG. 1) based on the information concerning packet data connection, as well as the radio network controller 12 (FIG. 1). The scope of the invention is not intended to be limited to what device in the network changes the TFCI bits.

In other words, when looking at battery improvement calculations one recognizes that DPCCH gating provides a very attractive way to save battery power in the receiver (rx) side battery consumption, which can be implemented as follows:

In operation, packet transmission cannot start in any frame after gating is started. It can only start e.g. in every Kth frame. Thus, in this case the rx side has to decode the whole frame only in every Kth frame. In the frames inbetween, the rx would have to wake up only during those slots that are transmitted during gating. The controller 12 of the network 10 would signal this parameter K to the UE 18, 20, 22 along with the other DPCCH gating parameters.

Moreover, looser handover measurement requirements may be defined during gating. For example, during gating it may be required that the UE 18, 20, 22 perform handover measurements only for those cells in the neighbor list, for which an initial search has already being done, since the initial search might be difficult to do during gating. Other handover measurements may also work even during gating.

The DPCCH gating is most likely to be used only with low speeds, about 3 km/h, since with higher speeds one gets more performance degradation due to slower power control cycles. Thus, if the UE 18, 20, 22 is slowly moving, then there is not likely to be a need to do the initial search for new cells very often. If avoiding this will save battery times, when nothing is being transmitted, then the benefit for battery consumption can be exploited.

Of course, as a default it is always possible for the operator to use K=1, which means that continuous decoding is required at rx side. One possibility would be that if K=1, then normal handover measurement requirements are valid, as discussed below.

Method B: Higher Layer Scheduling Scheme

Figure 7:
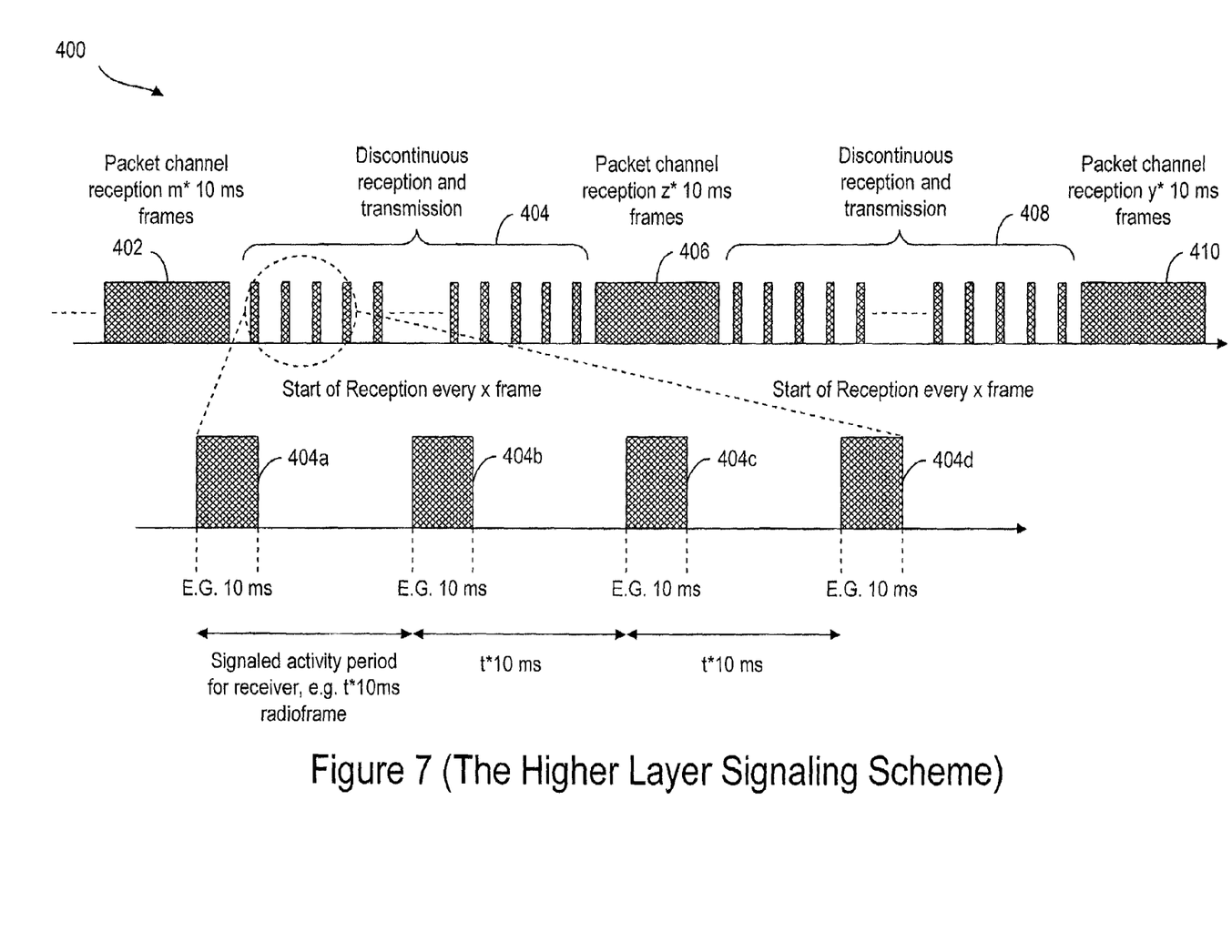
FIG. 7 is a diagram of usage of a higher layer signalling scheme.

FIG. 7 shows a diagram of a higher layer signalling scheme generally indicated as 400 for discontinuous reception to define the activity period. The higher layer signalling scheme 400 includes packet channel reception frames 402, a discontinuous reception and transmission period 404, packet channel reception frames 406, a discontinuous reception and transmission period 408 and packet channel reception frames 410. The packet channel reception frames 402, 406, 410 is when the receiver circuitry of the UE 18, 20, 22 (FIG. 1) has to be on all the time. The discontinuous reception and transmission periods 404, 408 is when the receiver circuitry of the UE 18, 20, 22 (FIG. 1) can be off for part of the time. The discontinuous reception and transmission period 404, includes intermittent frames 404a, 404b, 404c, 404d (every Kth frame) when the UE 18, 20, 22 (FIG. 1) has to detect whether packet transmission starts again.

In one embodiment, the radio network controller 12 (FIG. 1) defines the period where the UE 18, 20, 22 needs to perform a decoding of a frame(s) or a few slots in order to detect if the packet transmission is active. The UE 18, 20, 22 will be notified while decoding the frame that it consists of data targeted to it by having correct CRC result. If the frame does not consist of data for the UE, then a CRC error will occur. If not, the next active period will follow after an agreed period of time. There is no limitation on how long the packet transmission period can be, and the period is triggered to the point where the last transmitted frame has occurred. It's only an agreement issue whether it is the start or the end of the last frame, and will have no impact to the procedure in general.

The non-receiving state can be either a fixed period type, e.g the activity is occurring after a predefined period which is same during the connection unless the network is changing it, or the period can vary in order to the limit possible EMC radiation levels. In this case, both the radio network controller 12 and the UE 18, 20, 22 will perform an algorithm randomizing the discontinuous reception period, as shown and described in more in detail in relation to FIGS. 8–9. However, in the case of a frame based method, when the discontinuity period is reasonably long (e.g. 30 ms or upwards) the UE may switch on the transmitter smoothly in order to reduce the EMC radiation levels.

In FIG. 7, the invention is described for the case where the active period is fixed. In case of a random period, a value of N is calculated continuously by the radio network controller 12 and the UE 18, 20, 22 during the connection.

For a random non-receiving period, the radio network controller 12 will also define the period where the UE needs to perform a decoding of a frame or a few slots in order to detect if the packet transmission is active or not. When the packet transmission is not active, the next active period will follow after a random period (N) of radio frames. This value of N is signalled from the network to UE 18, 20, 22 similar as in the case in fixed period.

DPCCH Gating Method Allowing Both tx and rx Side Battery Life Improvement Avoiding Unnecessary Continuous Decoding As discussed above, to avoid the requirement of continuous decoding of each frame in the downlink (DL), in the present invention one defines that there is some information delivered to UE 18, 20, 22 (FIG. 1) that packet transmission is not supposed to start in any frame after gating is started. The packet transmission could start only e.g. in every Kth frame. Thus, the TFCI bits (FIG. 5) would exist in all slots only in those particular frames. In the frames in between, the TFCI bits do not have to exist in every slot, since TFCI decoding would not be done in those slots. In the frames inbetween, the rx would have to wake up only for every $3^{rd}$ slot with ⅓ gating, or every $5^{th}$ slot with ⅕ gating, for making signal-to-interference ratio (SIR) estimation and decoding TPC symbols, so that the inner loop power control continues working.

As shown in FIG. 7, the radio network controller 12 defines the period where the UE 18, 20, 22 needs to perform a decoding of the whole frame in order to detect if the packet transmission is active. If not, the next active period will follow after agreed period of time. There is no limitation on how long the packet transmission period can be after it has started. The period is triggered to the point where last transmitted frame has occurred. The only issue is whether it is the start or the end of the last frame.

Activity Period Randomizing

Figure 8:
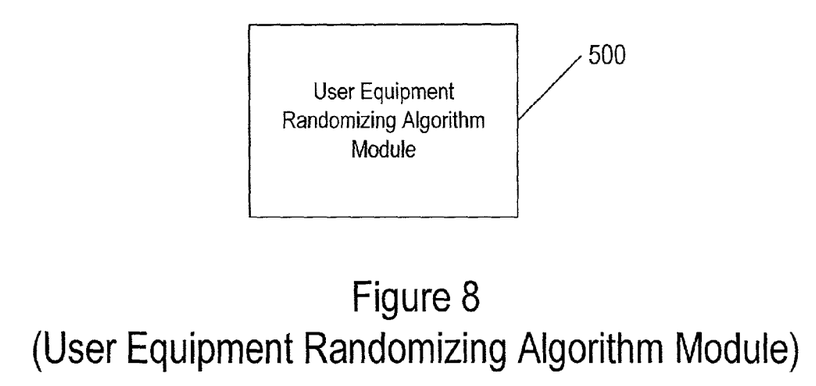
FIG. 8 shows a user equipment randomizing algorithm module.
Figure 9:
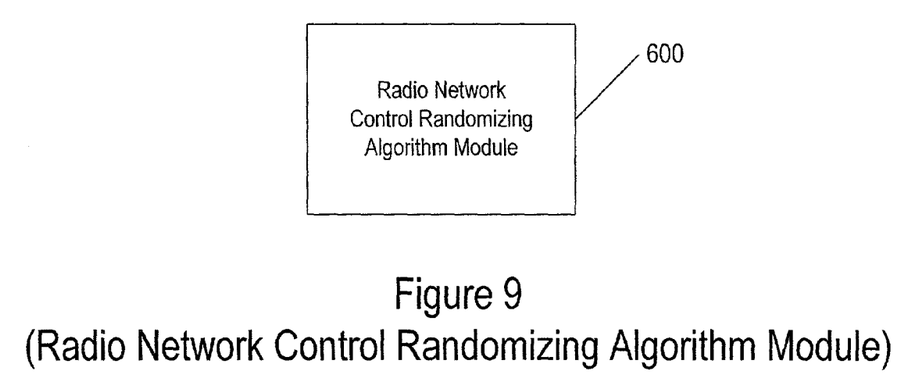
FIG. 9 shows a radio network control randomizing algorithm module.

FIGS. 8 and 9 show a user equipment randomizing algorithm module 500 and a radio network controller randomizing algorithm module 600. The user equipment randomizing algorithm module 500 and the radio network controller randomizing algorithm module 600 each may be implemented using hardware, software or a combination thereof. In a software embodiment, a typical microprocessor-based design may be used. As a person skilled in the art would appreciate, the microprocessor-based design would typically include a more expensive processor, ROM, RAM, input/output and data and address lines for coupling the same. The scope of the invention is not intended to be limited to any particular software implementation of the user equipment randomizing algorithm module 500 and the radio network controller randomizing algorithm module 600. A person skilled in the art after reading the patent application as a whole would appreciate how to implement any of the aforementioned module in hardware, software, or a combination thereof. The scope of the invention is also intended to include the randomizing algorithm being a part of the base stations architecture.

In the third generation partnership project (3GPP), the discussion of EMC protection is ongoing at the time of filing the present application. The proposed scheme under negotiation does not prevent the utilization of e.g. a random seed procedure for defining the exact starting time of active period. However, the proposed equations in the scheme may need slight refinement. The proposed scheme set forth in this patent application does not limit the random seed to be applicable only over 1 radio frame, but it can also be a multiple of frames.

Battery Life Calculations with Both tx and rx Gating Assumptions in UE Battery Life Calculations with tx and rx Gating The following assumptions have been used in the simplified UE battery life calculations with tx and rx gating. By way of example, the following calculations are based on a slot-based method, and similar calculations can be made for the frame-based method.

First, the percentage of battery consumption of tx side and rx side, respectively, is assumed for certain tx power level when gating is not used. For example, if the tx power level is represented by txpwr, then this results in the following:

tx side consumes N1 Ma @ txpwr
rx side consumes N2 Ma

No specific data rates were assumed here either in uplink or downlink, for simplification.

Second, one calculates what the tx side battery consumption is if tx gating is used. Separate values are calculated for ⅓ gating and ⅕ gating, with the same corresponding tx power level txpwr, which resulted in the following value:

tx side consumes N1_gating Ma, during gating @ txpwr.

Third, one also calculates what the rx side battery consumption (average battery consumption over K frames) is if rx gating is used. Here rx is on the whole frame in every Kth frame. And in the frames inbetween, the rx is on only in every $3^{rd}$ slot or every $5^{th}$ slot, with ⅓ gating or ⅕ gating, respectively, which resulted in the following value:

rx side consumes N2_gating Ma, during gating.

Fourth, one calculates the overall battery life improvement, as follows:

$$\text{Battery\_life\_improvement} = \frac{N1 + N2}{N1\_\text{total\_new} + N2\_\text{total\_new}}$$

where:

$N1\_\text{total\_new} = (1 - \text{DPCCH\_gating\_\%}) * N1 + \text{DPCCH\_gating\_\%} * N1\_\text{gating}$, and $N2\_\text{total\_new} = (1 - \text{DPCCH\_gating\_\%}) * N2 + \text{DPCCH\_gating\_\%} * N2\_\text{gating}$.

UE Battery Life Improvement Calculations with tx and rx Gating

The UE battery life improvement calculations is shown with tx and rx gating, where a higher layer scheduling idea has been used, to allow battery savings also in the rx side. Values K=1, 4 and 8 are used in the calculations, where K defines that the rx side has to be on the whole frame in every Kth frame. Note, K=1 gives the same result, as was given in our previous UE battery improvement calculations, where only the tx side improvement could be achieved, since K=1 means that the rx side has to be on in every frame.

Thus Tables 1 and 2 show UE battery lifetime improvements for DCH+DSCH case, with DPCCH_gating_%=0.66, for medium range tx pwr level and high tx power level, respectively. The calculation is not made for the case for DCH only, but for the case DPCCH_gating_%=0.3, since the main point is to evaluate whether the rx gating is providing clear battery life improvement, or whether the tx only gating (K=1 case) is providing enough battery improvement alone.

TABLE 1

UE battery life improvement due to gating, with medium range tx power level and DPCCH_gating_% = 0.66, which refers to DSCH + DCH case.

| Grating rate | K | UE battery life Improvement |
| --- | --- | --- |
| ⅓ | 1 | 21% |
|  | 4 | 32% |
|  | 8 | 34% |
| ⅕ | 1 | 34% |
|  | 4 | 56% |
|  | 8 | 60% |

TABLE 2

UE battery life improvement due to gating, with medium range tx power level. DPCCH_gating_% = 0.66 which refers to DSCH + DCH case.

| Grating rate | K | UE battery life Improvement |
| --- | --- | --- |
| ⅓ | 1 | 26% |
|  | 4 | 35% |
|  | 8 | 37% |
| ⅕ | 1 | 44% |
|  | 4 | 61% |
|  | 8 | 65% |

The aforementioned shows that the rx gating clearly further improves the UE battery life, and that there are more benefits from the DPCCH gating concept, if UE battery savings is provided both from the rx and tx sides.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A method comprising:
   operating user equipment in a telecommunication network for receiving packets during a packet service mode;
   receiving one or more packets during a packet service mode; and
   entering the user equipment into a discontinuous reception mode by receiving either:
   a) two or more slots of each radio frame, or
   b) one or more frames; and
   powering down receiver circuitry of the user equipment for either a) the remaining slots of the radio frame or b) one or more predefined periods, signaled by the telecommunication network, so as to establish a discontinuous radio link for the user equipment in the telecommunication network in a physical radio transmission layer when receiving the one or more packets while maintaining the logical connection in higher protocol layers during the packet service mode.

2. The method according to claim 1, wherein packet transmission starts in one out of every K radio frames.

3. The method according to claim 1, wherein the two or more slots are consecutive slots in the radio frame.

4. The method according to claim 1, wherein the two or more slots are non-consecutive slots in the radio frame.

5. The method according to claim 1, wherein the user equipment has an active period of two or more consecutive slots or idle frame(s) prior to its own reception for performing neighbor measurements and power control functions.

6. The method according to claim 5, wherein the user equipment adapts the active period depending on neighborhood conditions by increasing the active period when neighborhood conditions are unstable, and decreasing the active period when neighborhood conditions are stable.

7. The method according to claim 1, wherein the user equipment responds to a change in the status of a transport format combination indicator (TFCI) field in the two or more slots of the radio frame for determining an end of a data packet.

8. The method according to claim 7, wherein in a discontinuous reception mode the user equipment monitors a command in a transmission power control (TPC) field in the two or more slots of the radio frame and the status of the transport format combination indicator (TFCI) field in order to respond to commands from the telecommunications network.

9. The method according to claim 7, wherein the user equipment determines a start of a new packet transmission by monitoring the status of the transport format combination indicator (TFCI) field in a previous radio frame before a new packet data radio frame.

10. The method according to claim 1, wherein in the discontinuous reception mode the user equipment switches off the receiver circuitry for a part of the radio frame or one or more radio frames.

11. The method according to claim 10, wherein the radio frame includes fifteen slots, and the part of the radio frame that the user equipment switches off the circuitry in the receiver is thirteen of fifteen slots.

12. The method according to claim 1, wherein the user equipment receives higher layer signalling from a radio network controller or a base station in the telecommunications network that defines a period where the user equipment needs to perform a decoding of the radio frame or slots in order to detect if packet transmission is active.

13. The method according to claim 12, wherein the user equipment determines that the radio frame contains data targeted by decoding the radio frame using a cyclic redundancy code and having a correct cyclic redundancy code result.

14. The method according to claim 12, wherein the user equipment determines that the radio frame does not contain data targeted by decoding the radio frame using a cyclic redundancy code and having an incorrect cyclic redundancy code result; and waits an agreed period of time before decoding a subsequent radio frame.

15. The method according to claim 1, wherein in a discontinuous period the user equipment waits a fixed discontinuous period of time.

16. The method according to claim 1, wherein in a discontinuous period the user equipment waits a variable discontinuous period of time.

17. The method according to claim 16, wherein the user equipment, a radio network controller or a base station in the telecommunication network or both perform an algorithm randomizing the variable discontinuous period.

18. The method according to claim 16, wherein in a random non-receiving period the network defines the discontinuous period where the user equipment needs to perform a decoding of frame or slots in order to detect if packet transmission is active or not.

19. The method according to claim 18, wherein if the packet transmission is not active, the next active period follows after a random period of N radio frames.

20. The method according to claim 19, wherein a radio network controller or a base station in the network signals the value of N to the user equipment.

21. The method according to claim 1, wherein the user equipment concurrently enters into a discontinuous transmit mode and performs one or more closed loop power control sequences for following the fading of an uplink, a downlink or both when its transmitter is active.

22. User equipment comprising: one of more modules for operating in a telecommunication network for receiving one or more packets during a packet service mode; and
a user equipment power control loop module configured to enter the user equipment into a discontinuous reception mode for receiving two or more slots of each radio frame with receiver circuitry and for powering down the receiver circuitry for the remaining slots of the radio frame, so as to establish a discontinuous radio link for the user equipment in the telecommunication network in a physical radio transmission layer when receiving the one or more packets while maintaining the logical connection in higher protocol layers during the packet service mode.

23. The equipment according to claim 22, wherein the power control loop module checks for packet transmission in one out of every K radio frames.

24. The equipment according to claim 22, wherein the power control loop module checks two or more consecutive slots in the radio frame.

25. The equipment according to claim 22, wherein the power control loop module checks two or more non-consecutive slots in the radio frame.

26. A base station comprising: one or more modules configured for operating in a telecommunication network for providing one or more packets during a packet service mode to user equipment having receiver circuitry; and
a base station power control loop module configured to provide a signal to the user equipment to enter into a discontinuous reception mode for receiving two or more slots of each radio frame and to power down its receiver circuitry for the remaining slots of the radio frame, so as to establish a discontinuous radio link for the user equipment in the telecommunication network in a physical radio transmission layer when receiving the one or more packets while maintaining the logical connection in higher protocol Layers during the packet service mode.

27. The base station according to claim 26, wherein the signal contains information for the user equipment to check for packet transmission in one out of every K radio frames.

28. The base station according to claim 26, wherein the signal contains information for the user equipment to check two or more consecutive slots in the radio frame.

29. A The base station according to claim 26, wherein the signal contains information for the user equipment to check two or more non-consecutive slots in the radio frame.

30. Apparatus comprising:
means for operating user equipment in a telecommunication network for receiving packets during a packet service mode;
means for receiving one or more packets during a packet service mode; and
means for entering the user equipment into a discontinous reception mode by receiving either:
a) two or more slots of each radio frame, or
b) one or more frames; and powering down receiver circutry of the equipment for either a) the remaining slots of the radio frame b) one or more predefined periods, signaled by the telecommunication network, so as to establish a discontinous radio link for the user equipment in the telecomunication network in a physical radio transmission layer when receiving the one or more packets while maintaining the logical connection in higher protocol layers during the packet service mode.

* * * * *